United States Patent Office 3,709,879
Patented Jan. 9, 1973

3,709,879
10-(3-DIMETHYLAMINO-2-METHYLPROPYL)-2-VALERYLPHENOTHIAZINE
Shirish Chandubhai Amin, Hornchurch, David Henry Jones, Rayleigh, and Donald Robert Maxwell, Brentwood, England, assignors to May & Baker Limited, Dagenham, Essex, England
No Drawing. Filed Mar. 25, 1970, Ser. No. 22,706
Claims priority, application Great Britain, Mar. 27, 1969, 16,219/69
Int. Cl. C07d 93/14
U.S. Cl. 260—243 AA    1 Claim

ABSTRACT OF THE DISCLOSURE

The new phenothiazine derivatives of the formula:

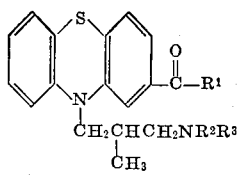

wherein $R^1$ represents alkyl of 1 through 4 carbon atoms, or cycloalkyl of 3 through 6 carbon atoms, and $R^2$ and $R^3$ represent alkyl of 1 through 4 carbon atoms, for example 10-(3-dimethylamino-2-methylpropyl) - 2 - valerylphenothiazine, and their oximes, are useful in the treatment of spasticity without inducing significant undesirable sedative side-effects.

---

This invention relates to new derivatives of phenothiazine, to processes for their preparation, and to pharmaceutical compositions containing them.

It is well known that various N-substituted phenothiazine derivatives possess valuable therapeutic properties. Some are useful in the management of psychiatric disorders, particularly those involving an increase in psychomotor activity, some are useful in the control of vomiting, for example in motion sickness, vomiting in pregnancy and radiation sickness, some are powerful antagonists of histamine and 5-hydroxytryptamine and are useful in the treatment of certain allergic and pruritic conditions and yet others are, for example, useful as anti-tussives. It has, nevertheless, been demonstrated that of the very large number of possible N-substituted phenothiazine compounds, which have heretofore been proposed or tested by various workers, only comparatively few types have been proved to have useful application in human or veterinary medicine and that both the nature, and the degree of useful effect can radically alter, even with apparently small changes in chemical structure.

In the specification of British Pat. No. 816,582 entitled "Improvements in or relating to the production of Derivatives of Phenothiazine" granted to Etablissements Clin-Byla on an application filed May 4, 1956, there are described 3-acyl-N-dialkylaminoalkylphenothiazines (the term "acyl" denoting broadly the residue of a carboxylic acid), and more especially 3-acyl-N-omega-dialkylaminoalkyl-phenothiazines. All the phenothiazine derivatives specifically disclosed in this specification, including 3-acetyl- and 3 - propionyl-N-γ-dimethylaminopropylphenothiazines, 3-acetyl- and 3-propionyl-N-γ-diethylaminopropyl-phenothiazines and 3-acetyl-N-β-dimethylaminoethylphenothiazine have a straight chain alkylene group attached to the nitrogen atom of the phenothiazine nucleus, viz. —$CH_2CH_2$— or —$CH_2CH_2CH_2$—. No description of the pharmacological properties of 3-acyl-N-dialkylamino-alkylphenothiazines is given in the aforesaid British specification other than in respect to 3-acetyl-N-γ-dimethyl-aminopropylphenothiazine (acepromazine) of which it is stated that "due to its powers of narcosis and of local anaesthesia, by its anti-emetic power, by its hypothermic power and by its lowering depressive effect upon the nerve centres it displays, used alone, a hypnotic action which chlorpromazine does not have." The aforesaid compound is, according to "The Merck Index" (8th edition 1968), p. 12, useful as a tranquilizer.

In the specification of British Pat. No. 871,002 entitled "Improvements in or relating to production of Phenothiazine Derivatives" granted to Etablissements Clin-Byla on an application filed June 25, 1957, there are described further specific 3-acyl-N-dialkylaminoalkyl-phenothiazines, all with a straight chain alkylene group or the alkylene group

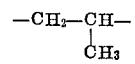

attached to the nitrogen atom of the phenothiazine nucleus, the acyl group being acetyl, propionyl, amino-substituted propionyl, butyryl or valeryl. The phenothiazine derivatives disclosed in British specification No. 871,002 are stated therein generally to have a lowering effect upon the central nervous system and other therapeutically-valuable properties, the outstanding pharmacological properties of typical compounds being given as: 3-butyryl-N-γ-dimethylaminopropylphenothiazine (or 3-butyryl-promazine) acid maleate-neuroplegic, depressive (central nervous system), potentializer (narcosis and local anaesthesia), adrenolytic, hypotensive, little toxic;

3-acetyl-N - β - dimethylaminopropylphenothiazine or 3-acetylpromethazine) acid maleate—slightly depressive, slightly adrenolytic, parasympatholytic, anti-histaminic, little toxic;
3-acetyl-N-β-dimethylaminopropylphenothiazine or 3-acetylpromethazine) methiodide—depressive, adrenolytic, hypotensive, parasympatholytic, very strongly anti-histaminic, inhibitor of stomach secretion, very little toxic;
3 - propionyl-N-β-dimethylaminopropylphenothiazine (or 3-propionylpromethazine) acid maleate—very depressive, hypnotic, anticonvulsant, local anaesthetic, slightly adrenolytic, parasympatholytic, strongly anti-histaminic, spasmolytic, very little toxic;
3 - β-morpholinopropionyl-N-γ-dimethylaminopropylphenothiazone acid diphosphate-depressive, adrenolytic, highly hypotensive, fairly little toxic.

None of the pharmacological properties mentioned in British patent specification Nos. 816,582 and 871,002 for the phenothiazine derivatives disclosed therein suggest, taken individually or in combination, possible usefulness in reducing spasticity, for example in skeletal muscle in upper-motor neurone (pyramidal) spasticity. In the treatment of spasticity it is highly desirable that the product used should exhibit little or no undesired side-effects at the dosage used, sedative activity being a particularly disadvantageous side-effect in this respect since a drug which reduces spasticity but also induces a state of sedation in the patient would be of little practical use. Thus certain of the pharmacological properties described in British patent specifications No. 816,582 and 871,002 for the class of 3-acyl-10-dialkylaminoalkyl-phenothiazines, e.g. the narcotic properties ascribed to acepromazine in British specification No. 816,582, would clearly suggest that the class of substances would be contra-indicated in the treatment of spasticity.

It must be observed that in British patent specifications Nos. 816,582 and 871,002 Beilstein's nomenclature is used in which the 3-position of the phenothiazine nucleus corresponds to the 2-position according to the system of nomenclature used in this specification to describe the compounds of the present invention, e.g. as hereinafter used in general Formula I.

As a result of research and experimentation, it has now been surprisingly found that when substitution in the 2-position (or 3-position according to Beilstein's nomenclature) of the phenothiazine nucleus by an alkanoyl group containing five carbon atoms only or a cycloalkanecarbonyl group containing four to seven carbon atoms is coupled with substitution of the 10-position of the phenothiazine nucleus by a dialkylaminoalkyl group with the specific branched alkylene chain

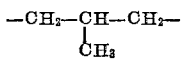

linking the nitrogen atom of the phenothiazine nucleus to an amino group of the formula $NR^2R^3$ (wherein $R^2$ and $R^3$ may be the same or different and represent straight- or branched-chain alkyl groups containing from one to four carbon atoms) the resulting phenothiazine derivatives and their oximes, and non-toxic acid addition salts of both, are effective in reducing spasticity of skeletal muscle in upper motor nuerone (pyramidal) spasticity at doses, for example 50 to 150 mg. of active substance (calculated as base) per day by oral administration in divided doses, which do not induce significant undesirable sedative side-effects.

Hence, according to the present invention there are provided new phenothiazine derivatives, which are useful in the treatment of spasticity, conforming to the general formula:

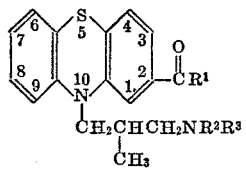

wherein $R^1$ represents a straight- or branched-chain alkyl group containing four carbon atoms, or a cycloalkyl group containing from three to six carbon atoms, preferably cyclopropyl or cyclobutyl, and $R^2$ and $R^3$ may be the same or different and each represents a straight- or branched-chain alkyl group containing from one to four carbon atoms, preferably methyl or ethyl groups, more particularly methyl, and their oximes and acid addition salts of both.

The phenothiazine derivatives of general Formula I have an asymmetric structure and therefore can exist in optically isomeric forms. The present invention includes all of these forms and racemates and mixtures thereof.

It has been suggested that upper-motor neurone (pyramidal) spasticity may be caused by hyperactivity of γ-motor neurones (otherwise known as fusimotor neurones) or, more rarely, by hyperactivity of α-motor nurones (see G. Rushworth, Proceedings of the Royal Society of Medicine, volume 57, August 1964, pp. 715 to 719). Rigidity observed in experimental animals rendered decerebrate by section of the brain between the colliculi (intercollicular decerebration) is caused by hyperactivity of γ-motor neurones (see E. M. Keary and D. R. Maxwell, British Journal of Pharmacology and Chemotherapy, volume 30, No. 2, June 1967, pp. 400 to 415). The drugs chlorpromazine and chlorproethazine reduce the rigidity of the intercollicular decerebrate cat and the former has been shown to reduce the discharge of γ-motor neurones in the intercollicular decerebrate cat. These two drugs have been shown to be effective in the clinic in reducing spasticity but neither has, however, found acceptance for general use in the treatment of spasticity, chlorpromazine being too sedative in its effects and chloroproethazine producing drowsiness and weakness which prevents the effective oral administration of the drug (see W. B. Matthews, Brain, volume 88, Part V, 1965, pp. 1057 to 1064 and E. M. Keary and D. R. Maxwell, loc. cit.).

In laboratory screening methods, the phenothiazine compounds of the invention have been shown to reduce the rigidity of experimental animals decerebrate at the intercollicular level at doses substantially lower than those required to produce significant sedation in standard laboratory tests. For example, 10-(3-dimethylamino-2-methylpropyl)-2-valerylphenothiazine has a minimum effective dose in abolishing the ridigidty of the intercollicular decerebrate cat of 0.75 mg./kg. animal body weight by oral administration and has an $ED_{50}$ of 120 mg./kg. animal body weight by oral administration in a standard test for sedative effects (reduction of motor activity) in the mouse. In the same tests, chlorpromazine has a minimum effective dose in abolishing the rigidity of the intercollicular decerebrate cat of 0.5–1.0 mg./kg. animal body weight by oral administration and an $ED_{50}$ of 8.5 mg./kg. animal body weight by oral administration in reducing motor activity in the mouse. Similarly, chlorproethazine has a minimum effective dose in abolishing the rigidity of the intercollicular decerebrate cat of 3–6 mg./kg. animal body weight by oral administration and an $ED_{50}$ of 8.0 mg./kg. animal body weight by oral administration in reducing motor activity in the mouse.

The drug acepromazine (hereinbefore mentioned), which has been recommended for use as a tranquillizer and sedative, is known to be effective in reducing the rigidity of the intercollicular decerebrate cat (see E. M. Keary and D. R. Maxwell, loc. cit.) but is highly sedative. In the tests mentioned above, acepromazine has a minimum effective dose in abolishing the rigidity of the intercollicular decerebrate cat of 0.25–0.5 mg./kg. animal body weight by oral administration and an $ED_{50}$ of 6 mg./kg. animal body weight by oral administration in reducing motor activity in the mouse.

In carrying out the above tests, the method for determining the dose of test compound which abolishes rigidity in the intercollicular cat was that described by E. M. Keary and D. R. Maxwell (loc. cit.), but with oral administration of the test compound. Reduction of motor activity in the mouse was determined by the method described by G. B. Leslie and D. R. Maxwell, British Journal of Pharmacology and Chemotherapy, vol. 22, No. 2, April 1964, p. 302.

According to a feature of the present invention, the phenothiazine derivatives of general Formula I are prepared by the reaction of a phenothiazine derivative of the general formula:

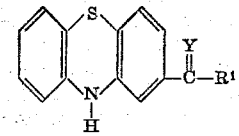

wherein $R^1$ is as hereinbefore defined and Y represents an oxygen atom or a group "protecting" the carbonyl group, for example an anil group $=NC_6H_5$, or a ketal group

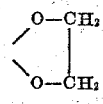

with a compound of the general formula:

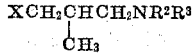

wherein $R^2$ and $R^3$ are as hereinbefore defined, and X represents an atom or group known to be of use for the introduction of an aminoalkyl group into the 10-position of the phenothiazine nucleus, for example, the acid residue of a reactive ester, for example a halogen atom, e.g. chlorine or bromine, or a sulphuric or sulphonic ester residue, for example a methanesulphonyloxy, toluene-p-sulphenyloxy or benzenesulphonyloxy group, or a carbamate, mono- or di-lower alkyl carbamate or di-lower alkyl carbonate group. Preferably the lower alkyl groups of the carbamate and carbonate groups contain from 1 to 3 carbon atoms.

When X represents the acid residue of a reactive ester, the reaction is preferably effected by first treating the phenothiazine of Formula II with an alkali metal amide, e.g. sodamide, or an alkali metal hydride, e.g. sodium hydride, in a suitable solvent, e.g. liquid ammonia, dimethylformamide or an aromatic hydrocarbon, e.g. toluene or xylene, or by treating the phenothiazine of Formula II with an alkali metal hydroxide, e.g. potassium hydroxide, in an aromatic hydrocarbon in order to eliminate water and give the 10-alkali metal derivative of the phenothiazine of Formula II, and then the compound of Formula III (wherein X represents the acid residue of a reactive ester) is added to the mixture to give the phenothiazine of Formula I, which may be isolated and purified by known methods. When X represents a carbamate, mono- or di-lower alkyl carbamate or di-lower alkyl carbonate group, the reaction is preferably effected by heating the reactants together, preferably to a temperature above 150° C., more particularly 200 to 280° C., preferably in the presence of a basic catalyst such as an alkali metal salt of a weak acid, in particular sodium and potassium formates, acetates, carbonates and neutral phthalates to give the phenothiazine of Formula I, which may be isolated and purified by known methods. If desired, the reaction may be carried out in an inert organic solvent of suitable high boiling point, e.g. o-dichlorobenzene, in the presence or absence of a basic catalyst. Preferably, an excess of the compound of Formula III (wherein X represents a carbamate, mono- or di-lower alkyl carbamate or di-lower alkyl carbonate group) by comparison with the phenothiazine of Formula II is used. When X represents a di-lower alkyl carbonate group, the compound of Formula III may be prepared and reacted in situ by mixing the phenothiazine with a compound of the general formula:

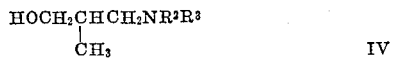

(wherein R² and R³ are as hereinbefore defined) in the presence of a basic catalyst, as hereinbefore described, adding a di-lower alkyl carbonate, the molecular ratio of the phenothiazine to the aminoalcohol of Formula IV and the di-lower alkyl carbonate being preferably 1:2:4, distilling off the excess aminoalcohol and dialkyl carbonate and further heating, preferably to a temperature above 150° C., more particularly 200 to 280° C., to give the phenothiazine of Formula I, which may be isolated and purified by known methods. Compounds of Formula III wherein X represents a di-lower alkyl carbonate group may be prepared by reacting a di-lower alkyl carbonate, e.g. diethyl carbonate, with a compound of Formula IV in the presence of a basic catalyst as hereinbefore described.

Compounds of Formula III wherein X represents a carbamate or mono- or di-lower alkyl carbamate group may be prepared by reacting a carbamoyl chloride of the formula R⁴R⁵NCOCl (wherein R⁴ and R⁵ each represent a hydrogen atom or a lower alkyl group) with a compound of Formula IV, preferably in the presence of a basic condensing agent, for example triethylamine.

If a protecting group is present in the starting material of Formula II, this protecting group may be removed and the 3-acylphenothiazine derivative of Formula I liberated from the product obtained by treatment with dilute mineral acid, for example hydrochloric acid.

Starting materials of Formula II wherein Y represents an oxygen atom may be prepared by known methods, for example following the methods of Schmitt, J. et al., Bull. Soc. Chim. Fr., 1957, 938; Takeda, A. and Nishimura, H., Chem. Pharm. Bull., Tokyo, 1962, 10, 1; Massie, S. P. et al., J. Org. Chem., 1956, 21, 1006.

Starting materials of Formula II wherein Y represents a protecting group may be prepared from the compounds of Formula II wherein Y represents an oxygen atom by known methods for the protection of ketonic carbonyl groups, for example by heating the ketone in an inert solvent, such as toluene or xylene, with aniline or ethylene glycol in the presence of a trace amount of toluene-p-sulphonic acid or zinc chloride. The mixture is preferably refluxed with simultaneous azeotropic elimination of water.

According to a further feature of the present invention, the phenothiazine derivatives of Formula I are prepared by the condensation of a phenothiazine of the general formula:

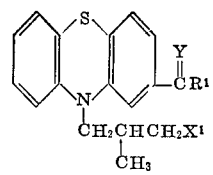

wherein R¹ and Y are as hereinbefore defined and X¹ represents the acid residue of a reactive ester, for example a halogen atom, e.g. chlorine or bromine, or a sulphuric or sulphonic ester residue, for example a methanesulphonyloxy, toluene-p-sulphonyloxy or benzenesulphonyloxy group, with an amine of the general formula HNR²R³, wherein R² and R³ are as hereinbefore defined. The condensation is preferably effected at elevated temperatures and pressures in an inert organic solvent, such as an alcohol, e.g. ethanol, or an aromatic hydrocarbon, e.g. toluene, in the presence of an acid acceptor, such as a tertiary amine, e.g. pyridine or triethylamine, or an excess of the amine of general formula HNR²R³, wherein R² and R³ are as hereinbefore defined. When Y represents a protecting group, this may be removed by methods hereinbefore mentioned.

The starting materials of Formula V wherein X¹ represents a chlorine atom may be prepared by the reaction of a 10-alkali metal derivative of a phenothiazine of general Formula II, prepared as hereinbefore mentioned, with 1-bromo-3-chloro-2-methylpropane. The reaction is preferably effected in liquid ammonia or an inert solvent, for example an aromatic hydrocarbon, e.g. toluene or xylene.

The starting materials of Formula V may also be prepared by the treatment of a 10-hydroxyalkylphenothiazine of the general formula:

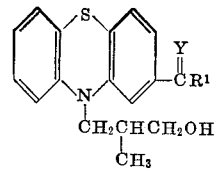

wherein R¹ and Y are as hereinbefore defined, with a reactant capable of replacing the hydroxy group by an atom or group X¹ as hereinbefore defined, for example a halogenating agent, e.g. thionyl chloride, phosphorus pentachloride, phosphorus tribromide, or a sulphonyl halide, e.g. toluene-p-sulphonyl chloride or benzenesulphonyl chloride.

The 10-hydroxyalkylphenothiazines of general Formula VI may be prepared by the reaction of a compound of the general formula:

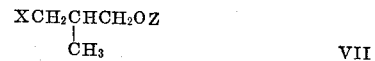

wherein X is a hereinbefore defined and Z represents a group protecting the alcohol function, for example a tetrahydro-2-pyranyl group, with a 10-alkali metal derivative of a phenothiazine of general Formula II, prepared as hereinbefore mentioned. The reaction is preferably effected in an inert organic solvent, for example an aromatic hydrocarbon, e.g. toluene or xylene. After the reaction, the protecting group Z is removed by known methods, for example by heating with an excess of dilute aqueous mineral acid, e.g. hydrochloric acid, when Z represents a tetrahydro-2-pyranyl group, to give the 10-hydroxy-alkylphenothiazines of Formula VI.

Compounds of Formula VII wherein Z represents a tetrahydro-2-pyranyl group may be prepared by known methods from the corresponding alcohols, i.e. compounds of Formula VII wherein Z represents a hydrogen atom, for example by reaction with 2,3-dihydropyran in an anhydrous organic solvent, e.g. diethyl ether, in the presence of a trace of concentrated mineral acid, e.g. hydrochloric acid, or an anhydrous organic acid, e.g. methanesulphonic acid.

According to another feature of the present invention, the phenothiazines of general Formula I are prepared by the reaction of a diphenylamine of the general formula:

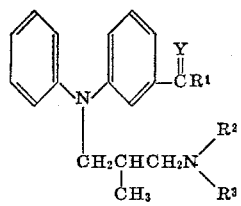

VIII wherein $R^1$, $R^2$, $R^3$ and Y are as hereinbefore defined, with two molecular equivalents of sulphur and a catalytic amount of iodine. The reaction is effected at 150–200° C. either by heating the reactants in the absence of a solvent or in solution in a suitable inert high-boiling solvent such as a halogenated aromatic hydrocarbon, e.g. o-dichlorobenzene. When Y represents a protecting group, this may be removed from the resulting products by methods hereinbefore mentioned.

Diphenylamine derivatives of general Formula VIII may be prepared by the alkylation of diphenylamine derivatives of the general formula:

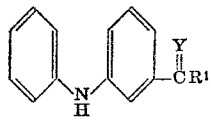

IX wherein $R^1$ and Y are as hereinbefore defined, with a compound of Formula III. The reaction may be effected by any known method for the alkylation of secondary amines, for example by heating the reactants in an inert solvent, such as an aromatic hydrocarbon, e.g. benzene or toluene, in the presence of an acid acceptor such as a tertiary amine, e.g. triethylamine, or an alkali metal hydroxide or carbonate.

Diphenylamine derivatives of general Formula IX may be prepared by the condensation of aniline with a m-bromoalkanophenone of the general formula:

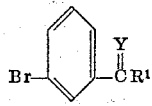

X where $R^1$ and Y are as hereinbefore defined. The condensation may be effected by known methods, such as by refluxing the reactants in an inert solvent, e.g. ethanol, in the presence of an acid acceptor, e.g. sodium bicarbonate.

The m-bromoalkanophenones of general Formula X may be prepared from the corresponding m-amino compounds (themselves prepared by the method of H. Oelschlager, Arzneimittel-Forsch., 1958, 8, 532) by diazotisation of the amino group and treatment with cuprous bromide.

According to a further feature of the present invention, the phenothiazine derivatives of general Formula I are prepared by the reaction of a 2-cyanophenothiazine of the general formula:

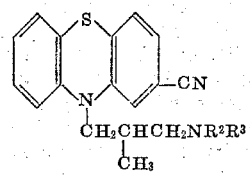

XI wherein $R^2$ and $R^3$ are as hereinbefore defined, with a Grignard reagent of the formula:

$$R^1MgX^2 \quad\quad XII$$

where $R^1$ is as hereinbefore defined, and $X^2$ represents a chlorine, bromine or iodine atom. The reaction may be effected by known methods for the preparation of ketones from nitriles and Grignard reagents, for example by condensation in diethyl ether followed by hydrolysis with dilute mineral acid.

The 2-cyanophenothiazines of general Formula XI used as starting materials may be prepared according to the methods of P. N. Craig et al., J. Org. Chem., 26, 1138 (1961), and British Pat. No. 805,886.

According to a further feature of the present invention, the phenothiazine derivatives of general Formula I are prepared by heating a diphenyl sulphide of the general formula:

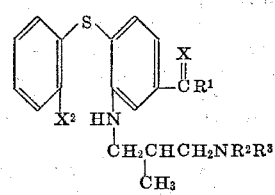

XIII (wherein the various symbols are as hereinbefore defined) in the presence of copper powder and an alkali metal carbonate, e.g. potassium carbonate. The heating is preferably effected in a high-boiling inert solvent such as nitrobenzene or dimethylformamide. When Y represents a protecting group, this may be removed by methods hereinbefore mentioned.

The starting materials of general Formula XIII may be prepared by the condensation of a compound of general Formula III with an amino diphenyl sulphide of the general formula:

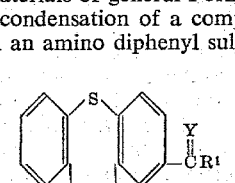

XIV where $R^1$, Y and $X^2$ are as hereinbefore defined.

The condensation is preferably effected in the presence of an acid acceptor, such as an alkali metal hydroxide or a tertiary amine, in an inert solvent such as an aromatic hydrocarbon, e.g. toluene or xylene.

The amino diphenyl sulphides of general Formula XIV may be prepared by the condensation of a thiophenol of general Formula XV (itself prepared by known methods, e.g. by the method of A. J. Saggiomo et al., J. Org. Chem. 1959, 23, 1906):

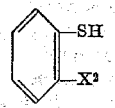

XV wherein $X^2$ is as hereinbefore defined, with a 3-nitro-4-bromo-alkanophenone of general Formula XVI (itself prepared by known methods, e.g. H. Oelschlager, Justus Liebigs Annln. Chem., 1961, 641, 81):

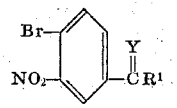

XVI where $R^1$ and Y are as hereinbefore defined, followed by reduction of the nitro group in the condensation product to a primary amino group. The condensation is preferably effected in an inert solvent, such as an ether, e.g. diethyl ether, an alcohol, e.g. ethanol, or an aromatic hydrocarbon, e.g. benzene or toluene, in the presence of an acid acceptor such as an alkali metal carbonate or hydroxide, or a tertitary amine. The reduction of the nitro group to amino may be effected by known methods, for example by the action of stannous chloride, iron and acetic acid, or tin and hydrochloric acid.

According to another feature of the present invention, the phenothiazine derivatives of general Formula I are prepared by the decarboxylation of a phenothiazine-10-carboxylate of the general formula:

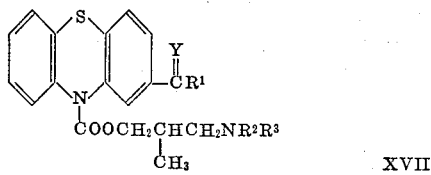

XVII wherein $R^1$, $R^2$, $R^3$ and Y are as hereinbefore defined, by heating the carboxylate above 100° C., for example between 150° and 280° C., until evolution of carbon dioxide ceases.

When Y represents a protecting group, this may be removed by methods hereinbefore mentioned.

The phenothiazine10-carboxylates of general Formula XVII may be prepared by the condensation of a phenothiazine derivative of general Formula II with a chloroformic ester of the general formula:

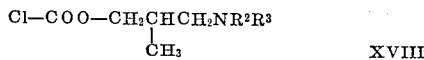

XVIII wherein $R^2$ and $R^3$ are as hereinbefore defined.

The phenothiazine10-carboxylates of general Formula XVII may also be prepared by the condensation of a phenothiazine derivative of general Formula II with phosgene in an inert organic solvent, for example an aromatic hydrocarbon, e.g. toluene or xylene, to give compounds of the general formula:

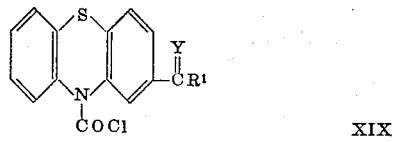

XIX (wherein $R^1$ and Y are as hereinbefore defined), followed by reaction with an aminoalcohol of general Formula IV.

The reactions of compounds of Formula II with compounds of Formula XVIII and of compounds of Formula XIX with compounds of Forumla IV may be effected in an inert solvent, for example an aromatic hydrocarbon, e.g. toluene or xylene, in the presence of an acid binding agent, for example an alkali metal carbonate or hydroxide or a tertiary amine.

According to a further feature of the present invention, the phenothiazine derivatives of general Formula I are prepared by condensing a phenothiazine derivative of general Formula II with an oxalyl ester of the general formula:

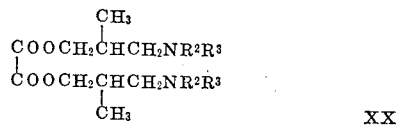

XX wherein $R^2$ and $R^3$ are as hereinbefore defined. The condensation may be effected by heating the reactants at above 150° C., for example at 180 to 210° C., optionally in the presence of a catalytic amount of anhydrous aluminium chloride, until the evolution of carbon monoxide and carbon dioxide ceases. When Y represents a protecting group, this may be removed as hereinbefore described.

The oxalyl esters of general Formula XX may be prepared by known methods, for example by reacting disodium oxalate with a compound of general Formula III or by reaction of oxalyl chloride with a compound of general Formula IV.

The oximes of 2-acylphenothiazines of general Formula I may be prepared by treatment of acid addition salts of compounds of general Formula I with hydroxylamine, preferably in the form of an acid addition salt, e.g. hydroxylamine hydrochloride. The reaction is preferably carried out at elevated temperature, e.g. at 40–100° C., in an aqueous or aqueous organic solvent, for example water or an aqueous lower alkanol, e.g. aqueous ethanol.

The new phenothiazine derivatives of general Formula I and their oximes may be converted by known methods into acid addition salts. These salts may be obtained by the action of acids on the phenothiazine derivatives and their oximes in appropriate solvents. As organic solvents there may be used, for example, alcohols, esters, ketones, ethers or chlorinated hydrocarbons; alternatively, water may advantageously be used as an inorganic solvent. The acid addition salt which is formed is precipitated, if necessary after concentration of its solution, and is separated by filtration or decantation.

In this specification the term "known methods" means methods heretofore used or described in the chemical literature.

The 2-acylphenothiazines of general Formula I and their oximes, and non-toxic acid addition salts of both, are as hereinbefore indicated, effective in reducing spasticity of skeletal muscle in upper-motor neurone (pyramidal) spasticity at doses which do not induce significant unndesirable sedative side-effects. Of outstanding importance for the treatment of spasticity are those compounds of general Formula I wherein $R^1$ represents an alkyl group containing four carbon atoms (preferably valeryl or isovaleryl), and more particularly those compounds in which $R^2$ and $R^3$ both represent methyl or ethyl (preferably methyl) groups, more especially 10-(3-dimethylamino-2-methylpropyl)-2-valerylphenothiazine.

For therapeutic purposes the bases of general Formula I and their oximes may be employed as such or in the form of non-toxic acid addition salts, i.e. salts containing anions which are relatively innocuous to the animal organisms in therapeutic doses of the salts (such as hydrochloride and other hydrohalides, phosphates, nitrates, sulphates, acetates, propionates, oxalates, succinates, benzoates, fumarates, maleates, citrates, tartrates, theophyllinates, theophyllinacetates, salicylates, phenolphthalinates, methanesulphonates, ethanedisulphonates, amsonates and embonates) so that the beneficial physiological properties inherent in the bases are not vitiated by side effects ascribable to the anions.

Acid addition salts containing anions which are not relatively innocuous may be utilised in the preparation of non-toxic salts, in the preparation of the oximes and in the isolation and purification of the bases.

The following examples illustrate the preparation of the phenothiazine derivatives of the present invention.

EXAMPLE 1

A mixture of 2-valerylphenothiazine (1.0 g., prepared by the method of Schmitt, J., Boitard, J., Comoy, P., Hallot, A., and Suquet, M., Bull. Soc. Chim. France, 1957, 938), powdered potassium hydroxide (2.0 g.) and dry toluene (200 ml.) was heated under reflux in a Dean and Stark apparatus for 1 hour. The mixture was cooled and 3-dimethylamino-2-methylpropyl chloride (12 ml. of a 20% w./v. solution in toluene) was added, and the mixture was heated under reflux for 12 hours.

The resultant mixture was washed thoroughly with water (5× 100 ml.) and extracted with 2 N hydrochloric acid (100 ml.). The pH of the acid extract was adjusted to 10–11 with 10 N sodium hydroxide solution and the sticky yellow mass which separated was extracted into toluene (2× 250 ml.). The toluene extract was dried over magnesium sulphate, treated with charcoal, filtered, and the filtrate was concentrated on the water-bath under reduced pressure (15–20 mm. Hg). Xylene (100 ml.) was added to the residual oil and was removed on the water-bath under reduced pressure (15–20 mm. Hg). The residual yellow oil was dissolved in dry diethyl ether (100 ml.) and treated with a slight excess of ethereal hydrogen chloride to give 10-(3-dimethylamino-2-methylpropyl)-2-valerylphenothiazine hydrochloride as pale yellow prisms from ethyl acetate, M.P. 122–125° C. The yield was 0.1 g.

By treating the base with oxalic acid there was obtained 10 - (3-dimethylamino-2-methylpropyl)-2-valerylphenothiazine hydrogen oxalate as pale yellow prisms, M.P. 92–94° C. from ethyl acetate.

EXAMPLE 2

A stirred mixture of 2-valerylphenothiazine (108 g.), powdered potassium hydroxide (42.8 g.) and 3-dimethylamino-2-methylpropyl chloride (310 ml. of a 20% w./v. solution in toluene) in toluene (300 ml.) was heated under reflux in a Dean and Stark apparatus for 8 hours. The resultant mixture was washed with water (2× 400 ml.) and extracted with 4 N hydrochloric acid (3× 150 ml.). The combined acid extracts were treated with saturated aqueous sodium chloride solution (500 ml.). The oil which separated was washed with saturated aqueous sodium chloride solution (500 ml.) and then treated with 2 N sodium hydroxide solution (300 ml.) and toluene (300 ml.). The mixture was well shaken, the toluene layer separated and the aqueous layer extracted with toluene (2× 100 ml.). The combined toluene solutions were dried over anhydrous magnesium sulphate and the toluene distilled off on a steam bath under reduced pressure (15 mm. Hg) to give crude 10-(3-dimethylamino-2-methylpropyl)-2-valerylphenothiazine (147.0 g.), which was then dissolved in toluene (750 ml.), stirred with decolourising charcoal (5 g.) for 15 minutes and filtered. The filtrate was treated with further decolourising charcoal (5 g.) and, without filtering, concentrated hydrochloric acid (39 ml.) was added. The stirred solution was heated under reflux in a Dean and Stark apparatus for 4 hours, filtered while hot and the filtrate allowed to cool slowly to about 45° C. and maintained at this temperature for 1½ hours. The mixture was then allowed to cool slowly, with slow stirring, to laboratory temperature. The resultant solid was filtered off, washed with light petroleum (B.P. 40–60° C.; 2000 ml.), dried under reduced pressure (150 mm. Hg) at 60° C. and recrystallised from ethyl acetate containing 2% v./v. of ethanol to give 10 - (3 - dimethylamino-2-methylpropyl)-2-valerylphenothiazine hydrochloride (118.0 g.) as pale-yellow microprisms, M.P. 122–125° C.

Distillation of crude 10-(3-dimethylamino-2-methylpropyl) - 2 - valerylphenothiazine obtained as described above gave the pure base, B.P. 226–228° C./0.05 mm. Hg.

By treating crude 10-(3-dimethylamino-2-methylpropyl)-2-valerylphenothiazine, obtained as described above, with the calculated amount of maleic acid in ethyl acetate under reflux, there was obtained, after recrystallisation from ethyl acetate, 10-(3-dimethylamino-2-methylpropyl)-2-valerylphenothiazine hydrogen maleate as pale-yellows microprisms, M.P. 115–116° C.

By treating crude 10-(3-dimethylamino-2-methylpropyl)-2-valerylphenothiazine, obtained as described above, with an ethereal solution of camphoric acid, there was obtained 10-(3-dimethylamino-2-methylpropyl)-2-valerylphenothiazine camphorate as pale-yellow prisms, M.P. 83–85° C.

By treating crude 10-(3-dimethylamino-2-methylpropyl)-2-valerylphenothiazine, obtained as described above, with embonic acid in ethanol, there was obtained, after recrystallisation from propan-2-ol, 10-(3-dimethylamino-2 - methylpropyl)-2-valerylphenothiazine embonate as pale-yellow prisms, M.P. 127–131° C.

By treating crude 10-(3-dimethylamino-2-methylpropyl)-2-valerylphenothiazine, obtained as described above, with amsonic acid in ethanol, there was obtained 10-(3-dimethylamino-2-methylpropyl)-2 - valerylphenothiazine amsonate as pale-yellow prisms M.P. 141–144° C.

EXAMPLE 3

A stirred mixture of 2-isovalerylphenothiazine (4.0 g.), powdered potassium hydroxide (1.6 g.) and 3-dimethylamino-2-methylpropyl chloride (2.1 g.) in toluene (200 ml.) was heated in a Dean and Stark apparatus for 8 hours. The mixture was cooled, washed with water (3× 100 ml.) and extracted with 2 N acetic acid (3× 50 ml.). The pH of the combined acid extracts was adjusted to 11 with 2 N sodium hydroxide solution and the resultant oil was extracted with diethyl ether (3× 100 ml.). The combined ethereal extracts were dried over anhydrous magnesium sulphate and the diethyl ether distilled off. The residue was heated on a steam bath under reduced pressure (0.5 mm. Hg) for 30 minutes, cooled, diluted with anhydrous diethyl ether (100 ml.) and treated with oxalic acid in diethyl ether to give 10-(3-dimethylamino-2 - methylpropyl)-2-isovalerylphenothiazine hydrogen oxalate (1.7 g.) as yellow microprisms, M.P. 65–68° C. (with decomposition).

The 2-isovalerylphenothiazine (5.85 g.), as yellow prisms M.P. 193–195° C. after recrystallisation from toluene, used in the above preparation was obtained from 10-acetylphenothiazine (24.1 g.), isovaleryl chloride (12.55 g.) and aluminium chloride (40.0 g.) in carbon disulphide (400 ml.) by the method described by Schmitt J. et al., Bull. Soc. Chim. France, 1957, 938, for the preparation of 2-valerylphenothiazine.

EXAMPLE 4

Proceeding as in Example 3 but replacing the 2-isovalerylphenothiazine by 2-valerylphenothiazine (5.5 g.) and the 3-dimethylamino-2-methylpropyl chloride by 3-diethylamino-2-methylpropyl chloride (3.9 g.), there was obtained 10-(3-diethylamino-2-methylpropyl)-2-valerylphenothiazine, B.P. 245–250° C./0.5 mm. Hg, which on treatment with oxalic acid in diethyl ether, gave 10-(3-diethylamino-2-methylpropyl)-2-valerylphenothiazine hydrogen oxalate (0.6 g.) as yellow microprisms, M.P. 148° C. (with decomposition).

EXAMPLE 5

Sodium (1.15 g.) was added in small portions over 30 minutes to a stirred solution of powdered ferric nitrate (0.8 g.) in liquid ammonia (250 ml.) at −30 to −40° C. The solution was stirred until the blue colour changed to grey and 2-valerylphenothiazine (11.32 g.) was then added followed by, after 10 minutes, 1-bromo-3-chloro-2-methylpropane (13.7 g.). The mixture was stirred at −40 to −50° C. for 4 hours and then at −30° C. for 1 hour. Ammonium bromide (4 g.) (to decompose the excess of sodamide) and anhydrous toluene (50 ml.) were added and the mixture was stirred at room temperature overnight, allowing the ammonia to evaporate. The mixture was filtered and the residue washed with toluene. The toluene layer was separated, washed with water (50 ml.), dried over anhydrous magnesium sulphate and chromatographed through a column (diameter 2.5 cm.; height 30 cm.) of chromatographic-grade alumina (120 g.). The column was eluted with toluene (1500 ml.). The toluene eluate was collected and the toluene removed by distillation under reduced pressure (15 mm. Hg) to give crude 10-(3-chloro-2-methylpropyl)-2-valerylphenothiazine. [In the above preparation, sodium may be replaced by an equivalent quantity of potassium hydroxide with a catalytic amount of sodium.]

A mixture of the crude 10-(3-chloro-2-methylpropyl)-2-valerylphenothiazine (1.0 g.), dimethylamine (15 g.)

and toluene (15 ml.) was heated in a sealed tube at 110–120° C. for 20 hours. The cooled solution was washed from the tube with toluene (50 ml.) and the toluene solution heated at 100° C. for 30 minutes to remove excess dimethylamine. The toluene solution was then extracted with 2 N acetic acid (3× 50 ml.) and the pH of the combined acid extracts was adjusted to 11 with 10 N sodium hydroxide solution. The resultant yellow oil was extracted with diethyl ether (3× 75 ml.). The combined ethereal extracts were dried over anhydrous magnesium sulphate and treated with ethereal hydrogen chloride to give 10 - (3-dimethylamino-2-methylpropyl)-2-valerylphenothiazine hydrochloride, identical to the products of Examples 1 and 2.

EXAMPLE 6

10 - (3-dimethylamino-2-methylpropyloxycarbonyl)-2-valerylphenothiazine (2.2 g.) was heated at 250–280° C. for 30 minutes. The reaction mixture was cooled, treated with diethyl ether (20 ml) and filtered to remove 2-valerylphenothiazine (0.2 g.) obtained as a by-product. The filtrate was extracted with 2 N hydrochloric acid (10 ml.), the aqueous layer was adjusted to pH 11 with 2 N sodium hydroxide solution and extracted with diethyl ether (3× 50 ml.). The ethereal extract was dried over anhydrous magnesium sulphate and chromatographed through a column (diameter 2.5 cm.; height 30 cm.) of chromatographic grade alumina (120 g.). The column was eluted successively with diethyl ether (250 ml.), a 1:1 by volume mixture of diethyl ether and toluene (250 ml.), and toluene (750 ml.). The toluene fraction was collected, and the toluene removed by distillation under reduced pressure (15 mm. Hg) to give 10-(3-dimethylamino-2-methylpropyl)-2-valerylphenothiazine, which on treatment with ethereal hydrogen chloride gave 10-(3-dimethylamino-2-methylpropyl)-2-valerylphenothiazine hydrochloride 0.5 g.) identical to the products of Examples 1, 2 and 5.

The 10 - (3 - dimethylamino-2-methylpropyloxycarbonyl)-2-valerylphenothiazine used as starting material in the above preparation was obtained as follows:

Phosgene was bubbled into a vigorously stirred solution of 2-valerylphenothiazine (11.8 g.) in anhydrous toluene (300 ml.) at 100° C. over 10 hours. The solution was then stirred at 100° C. for a further 20 hours and the toluene removed under reduced pressure (15 mm. Hg). The residual oil was dissolved in toluene (50 ml.) and chromatographed through a column (diameter 2.5 cm.; height 30 cm.) of chromatographic grade alumina (120 g.). The column was eluted with toluene (750 ml.). The first yellow toluene eluate was collected and the toluene removed under reduced pressure (15 mm. Hg) to give crude 2-valerylphenothiazin-10-ylcarbonyl chloride (7.0 g.), which was then mixed with 3-dimethylamino-2-methylpropan-1-ol (4.0 g.) in anhydrous acetone (80 ml.) and heated under reflux for 5 hours. Water (50 ml.) and concentrated hydrochloric acid (2 ml.) were added and the acetone was removed under reduced pressure (15 mm. Hg). The pH of the aqueous residue was adjusted to 11 with 2 N sodium hydroxide solution and the resultant oil was extracted with diethyl ether (2× 100 ml.). The combined ethereal extracts were dried over anhydrous magnesium sulphate. Treatment with ethereal hydrogen chloride gave, after recrystallisation from ethyl acetate, 10-(3-dimethylamino-2-methylpropyloxycarbonyl) - 2 - valerylphenothiazine hydrochloride (5.2 g.) as prisms, M.P. 156° C., which (3.5 g.) was then dissolved in water. The pH of the aqueous solution was adjusted to 11 with 2 N sodium hydroxide solution and the solution extracted with diethyl ether (2× 75 ml.). The combined ethereal extracts were dried over anhydrous magnesium sulphate and the ether evaporated off to give 10-(3-dimethylamino-2-methylpropyloxycarbonyl) - 2 - valerylphenothiazine (2.2 g.) as an oil.

EXAMPLE 7

Proceeding as in Example 3 but commencing with 2-cyclobutanecarbonylphenothiazine (1.2 g.), sodium hydride (0.25 g.) and 3-dimethylamino-2-methylpropyl chloride (1.35 g.) in toluene (50 ml.), there was obtained 2-cyclobutanecarbonyl - 10 - (3-dimethylamino-2-methylpropyl)phenothiazine which was treated with oxalic acid in diethyl ether to give, after recrystallisation from ethyl acetate, 2-cyclobutanecarbonyl - 10 - (3-dimethylamino-2-methylpropyl)phenothiazine hydrogen oxalate hemihydrate (0.2 g.) as pale-yellow microprisms, M.P. 92–94° C. (with decomposition).

The 2-cyclobutanecarbonylphenothiazine used in the above preparation was obtained from 10-acetylphenothiazine (32.0 g.), cyclobutanecarbonyl chloride (14.8 g.) and aluminium chloride (53.1 g.) in carbon disulphide (500 ml.) by the method described by Schmitt J. et al., Bull. Soc. Chim. France, 1957, 938, for the preparation of 2-valerylphenothiazine. The product was purified by dissolving in carbon tetrachloride (50 ml.), chromatographing through a column (diameter 2.5 cm.; height 30 cm.) of chromatographic grade alumina (120 g.) and eluting successively with carbon tetrachloride (500 ml.), a 1:1 by volume mixture of carbon tetrachloride and toluene (600 ml.), and toluene (1000 ml.). The toluene fraction was collected and the toluene distilled off under reduced pressure (15 mm. Hg) to give 2-cyclobutanecarbonylphenothiazine (1.2 g.) as yellow prims, M.P. 183–185° C.

EXAMPLE 8

A mixture of 10-(3-dimethylamino-2-methylpropyl)-2-valerylphenothiazine camphorate (15.6 g.) (prepared as described in Example 2) and hydroxylamine hydrochloride (2.8 g.) in water (200 ml.) was heated under reflux for 45 minutes. The mixture was cooled and the pH was adjusted to 9 with 2 N sodium hydroxide solution. The resulting thick, pale-yellow mass was filtered off, washed with water (4× 100 ml.) and dried in a desiccator over silica-gel for 24 hours to give crude 10-(3-dimethylamino-2-methylpropyl)-2-valerylphenothiazine oxime (15.8 g.), M.P. 95–100° C. The crude oxime (1.0 g.) was dissolved in anhydrous diethyl ether (150 ml.) and treated dropwise with a solution of oxalic acid in diethyl ether until precipitation was complete. The precipitate was filtered off, washed with diethyl ether (100 ml.) and recrystallised from ethyl acetate to give 10-(3-dimethylamino-2-methylpropyl)-2-valerylphenothiazine oxime hydrogen oxalate (0.45 g.) as pale yellow prisms, M.P. 148–150° C.

EXAMPLE 9

A solution of 2-valerylphenothiazine (14.2 g.) in o-dichlorobenzene (10 ml.) was heated to 175° C. and a solution of 3 - dimethylamino - 2 - methylpropan-1-ol (7.0 g.) in diethyl carbonate (12.5 g.) was added dropwise during 1 hour. The temperature of the mixture was maintained at 175° C. for 2 hours and then gradually raised to 210° C. (by distilling off lower boiling materials), where it was maintained for 13 hours. The mixture was cooled and extracted with diethyl ether (3× 125 ml.). The combined ether solutions were extracted with 2 N acetic acid (4× 100 ml.) and the pH of the combined aqueous extracts was then adjusted to 11 with 10 N sodium hydroxide. The resulting oil was extracted into diethyl ether (3× 125 ml.) and dried over anhydrous magnesium sulphate. Distillation under reduced pressure gave 10-(3 - dimethylamino - 2 - methylpropyl)-2-valerylphenothiazine (8.0 g.), B.P. 210–215° C./0.05 mm. Hg. The infrared spectrum was identical to that of a sample of 10-(3-dimethylamino-2-methylpropyl)-2-valerylphenothiazine prepared as described in Example 2.

EXAMPLE 10

Sodium (1.0 g.) was added in small portions over 30 minutes to a stirred solution of powdered ferric nitrate (0.1 g.) in liquid ammonia (100 ml.) at —30 to —40° C. The solution was stirred until the blue colour turned to grey (ca. 90 min.), and a suspension of 2-cyclopropane-carbonylphenothiazine (9.9 g., prepared by the method described in French Pat. No. 1,361,571 to Soc. Ind. pour la Fab. des Antibiotiques) in dry toluene (120 ml.) was added. The reaction mixture was stirred overnight at room temperature, allowing the ammonia to evaporate. 3-dimethylamino-2-methylpropyl chloride (6.4 g. (was then added and the stirred mixture heated to reflux for 6 hours. The reaction mixture was cooled and filtered through Hyflo ("Hyflo" is a registered trademark). The filtrate was extracted with 2 N acetic acid (3× 75 ml.) and the pH of the combined acid extracts adjusted to 11 with 10 N sodium hydroxide solution. The resulting oil was extracted into diethyl either (3× 100 ml.) and the combined ether extracts were dried over anhydrous magnesium sulphate. Treatment of the ethereal solution with hydrogen chloride in dry diethyl ether gave 2-cyclopropanecarbonyl - 10 - (3 - dimethylamino-2-methylpropyl)phenothiazine hydrochloride hydrate (1.8 g.), M.P. 166–170° C., as yellow microprisms after recrystallisation from a solution of ethyl acetate in diethyl ether (25% v./v.).

EXAMPLE 11

A mixture of 2 - valerylphenothiazine anil (3.6 g.), powdered potassium hydroxide (1.1 g.) and 3-dimethylamino-2-methylpropyl chloride (5.0 g.) in dry toluene (100 ml.) was heated under reflux in a Dean and Stark apparatus for 6½ hours. The toluene layer was then decanted from the inorganic residue and washed with water (3× 75 ml.). The toluene layer was treated with 2 N hydrochloric acid (100 ml.), shaken for 2 minutes and then allowed to stand for 10 minutes (to liberate the carbonyl compound). The acid layer was separated off and the pH was adjusted to 11 with 10 N sodium hydroxide solution. The resulting oil was extracted into diethyl ether (3× 100 ml.) and the combined diethyl ether solutions were dried over anhydrous magnesium sulphate. The diethyl ether was distilled off and the residue was heated on a steam bath under reduced pressure (0.05 mm. Hg) for 30 minutes. The infra-red spectrum of the residual 10-(3-dimethylamino-2-methylpropyl) - 2 - valerylphenothiazine (3.5 g.) was identical with that of a sample prepared as described in Example 2.

The 2-valerylphenothiazine anil used as a starting material in the above preparation was obtained as follows:

A stirred mixture of 2-valerylphenothiazine (21.3 g.), redistilled aniline (18.6 g.), freshly fused zinc chloride (1.0 g.) and dry xylene (5 ml.) was heated at 180–220° C. for 5½ hours in a Dean and Stark apparatus (ca. 1.4 ml. of water was separated). The mixture was then poured into a beaker and allowed to crystallise overnight. The resulting solid mass was extracted with diethyl ether (10× 75 ml.) and evaporation of the combined diethyl ether extracts gave a yellow residue (15 g.). This was recrystallised three times from benzene to give 2-valerylphenothiazine anil (5.0 g.) as pale yellow prisms, M.P. 161° C.

The present invention further includes within its scope pharmaceutical compositions which comprise, as active ingredient, one or more phenothiazine derivatives of general Formula I and their oximes, or non-toxic acid addition salts of both, together with a pharmaceutical carrier or coating. In clinical practice the compounds of the present invention will normally be administered orally, rectally or parentally.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Solid compositions for rectal administration include suppositories formulated in manner known per se and containing one or more of the active compounds.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025% by weight of active substance when required for administration by injection; for oral administration the preparations will normally contain at least 0.1% by weight of active substance. In human therapy for the treatment of spasticity the compositions should generally be administered so as to give, in the case of oral administration, 50–150 mg. of active substance (calculated as base) per day in divided doses and, in the case of parenteral administration, 10–50 mg. of active substance (calculated as base) per day, for example 10–20 mg. by intravenous administration per day.

The following examples illustrate pharmaceutical compositions according to the invention:

EXAMPLE 12

Tablets (150 mg.) were prepared containing:

| | Mg. |
|---|---|
| 10-(3-dimethylamino - 2 - methylpropyl)-2-valerylphenothiazine hydrochloride | 27.4 |
| Starch | 87.6 |
| Powdered silica | 30 |
| Magnesium stearate | 3 |

EXAMPLE 13

A solution suitable for intravenous administration was prepared as follows:

10-(3-dimethylamino - 2 - methylpropyl) - 2 - valerylphenothiazine hydrochloride (1.0 g.) was dissolved in water (100 ml.) containing 5% w./w. of Cremophor-EL (a polyoxyethylated castor oil derivative emulsifying agent). The pH of the solution was then adjusted to 7.2 by the addition of 1 N sodium hydroxide solution. The resulting solution was placed in 10 ml. ampoules at a rate of 5 mls. of solution per ampoule. The ampoules were sealed and sterilized by heating at 110° C. for 30 minutes without loss of biological potency.

We claim:
1. 10-(3-dimethylamino - 2 - methylpropyl)-2-valeryl-phenothiazine and its non-toxic acid addition salts.

References Cited

UNITED STATES PATENTS

| | | | |
|---|---|---|---|
| 3,346,573 | 10/1967 | Fabricius | 260—243 |
| 3,341,533 | 9/1967 | Yale | 260—243 |
| 2,928,767 | 3/1960 | Gulesich et al. | 167—52 |
| 3,055,890 | 9/1962 | Jacob et al. | 260—243 |
| 3,063,996 | 11/1962 | Gordon | 260—243 |
| 3,075,976 | 1/1963 | Jacob et al. | 260—243 |
| 3,359,265 | 12/1967 | Jucker et al. | 260—243 |
| 3,445,464 | 5/1969 | Jucker et al. | 260—243 |
| 3,531,480 | 9/1970 | Jucker et al. | 260—243 |

FOREIGN PATENTS

| | | | |
|---|---|---|---|
| 871,002 | 6/1961 | Great Britain | 260—243 |
| 816,582 | 7/1959 | Great Britain | 260—243 |

HENRY R. JILES, Primary Examiner

G. T. TODD, Assistant Examiner

U.S. Cl. X.R.

260—570.5 P, 576, 578; 424—247